May 29, 1956
F. D. BUTLER
2,747,429
INTERNAL FLUID PRESSURE VARIABLE, COMBINED HYDRODYNAMIC
AND PLANETARY GEARING DRIVEN, REVERSIBLE
SUN-GEAR TYPE OF, TRANSMISSION COUPLER
Filed Sept. 18, 1951
3 Sheets-Sheet 1
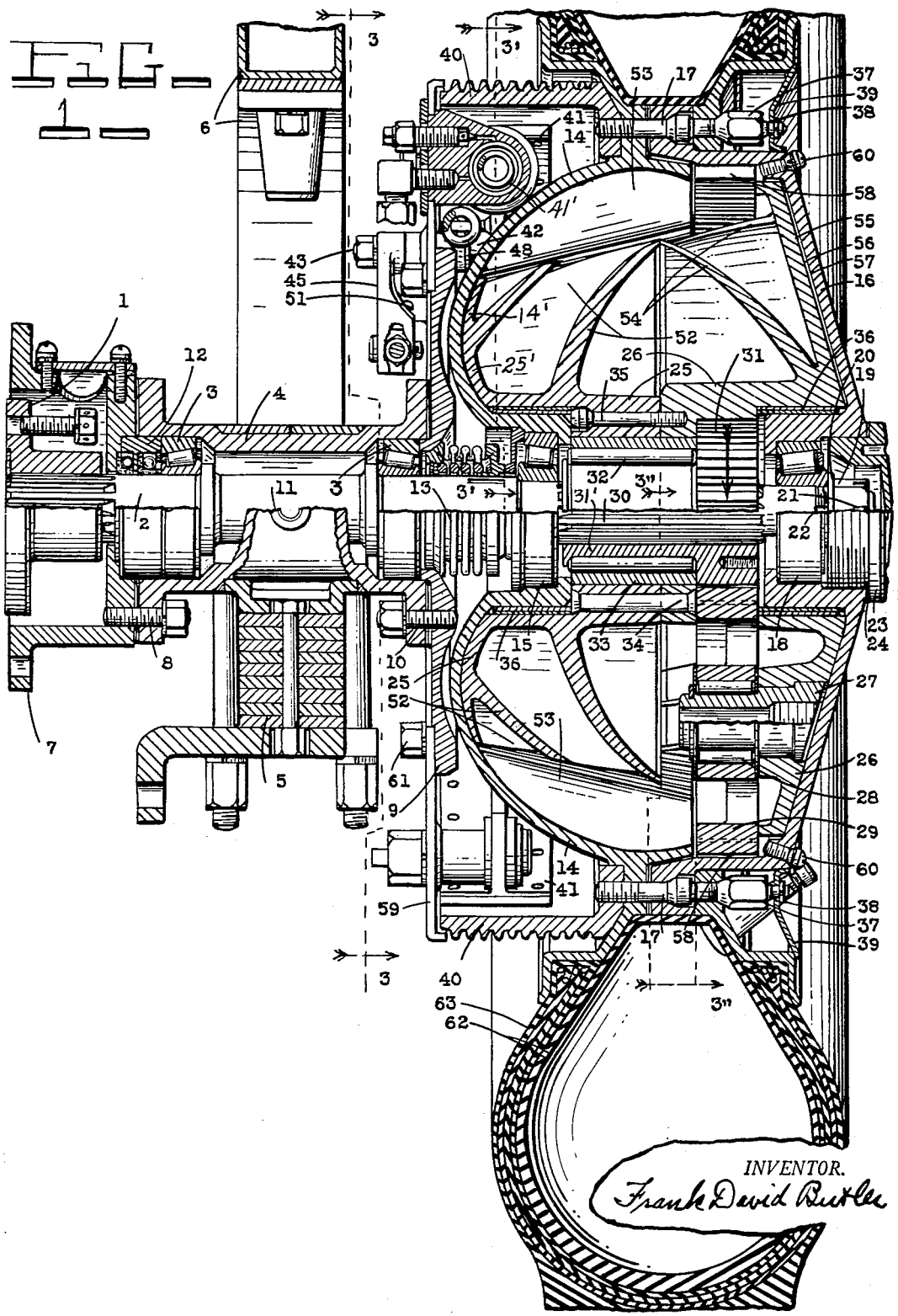
INVENTOR.
Frank David Butler

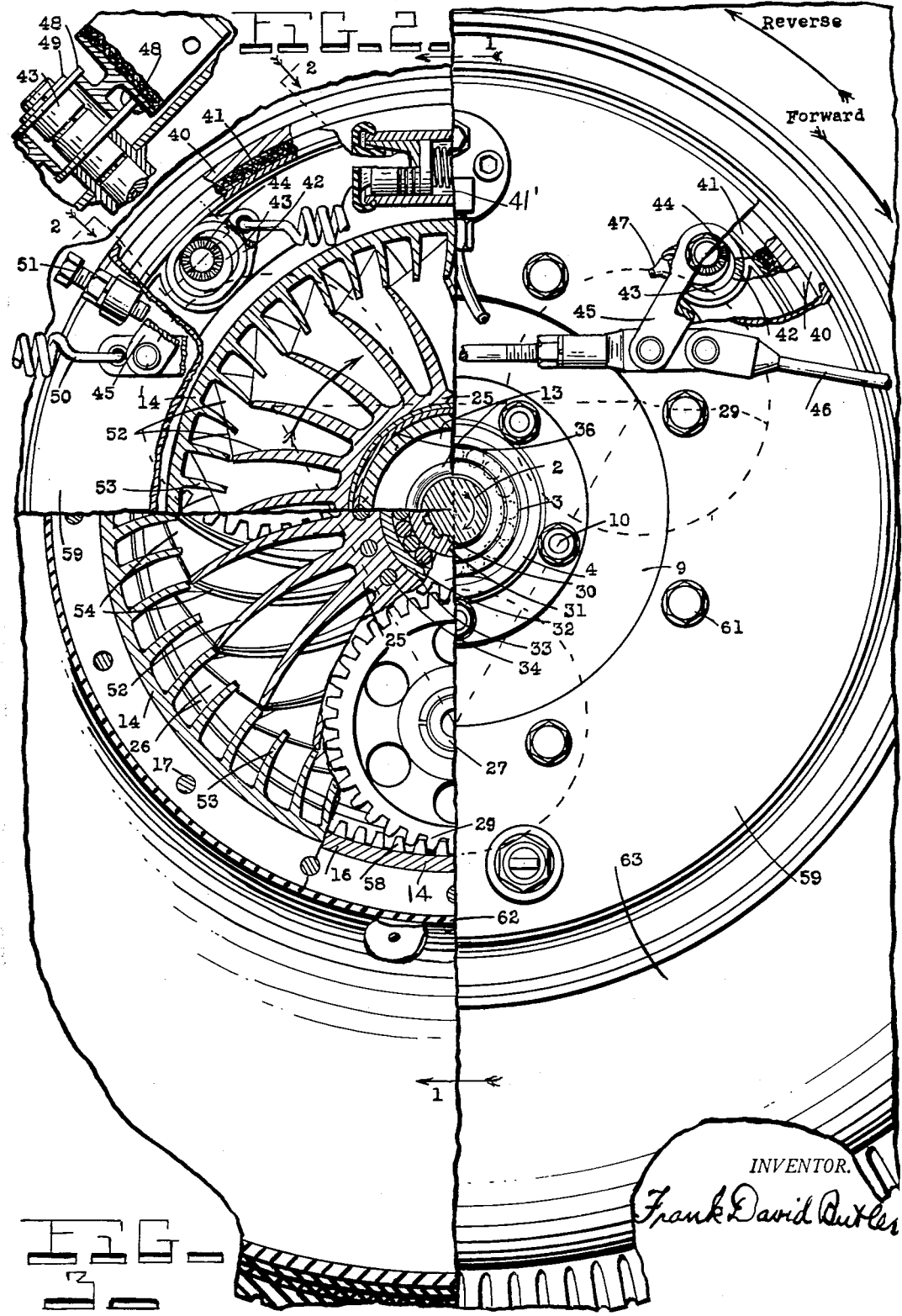

May 29, 1956     F. D. BUTLER     2,747,429
INTERNAL FLUID PRESSURE VARIABLE, COMBINED HYDRODYNAMIC
AND PLANETARY GEARING DRIVEN, REVERSIBLE
SUN-GEAR TYPE OF, TRANSMISSION COUPLER
Filed Sept. 18, 1951     3 Sheets-Sheet 3
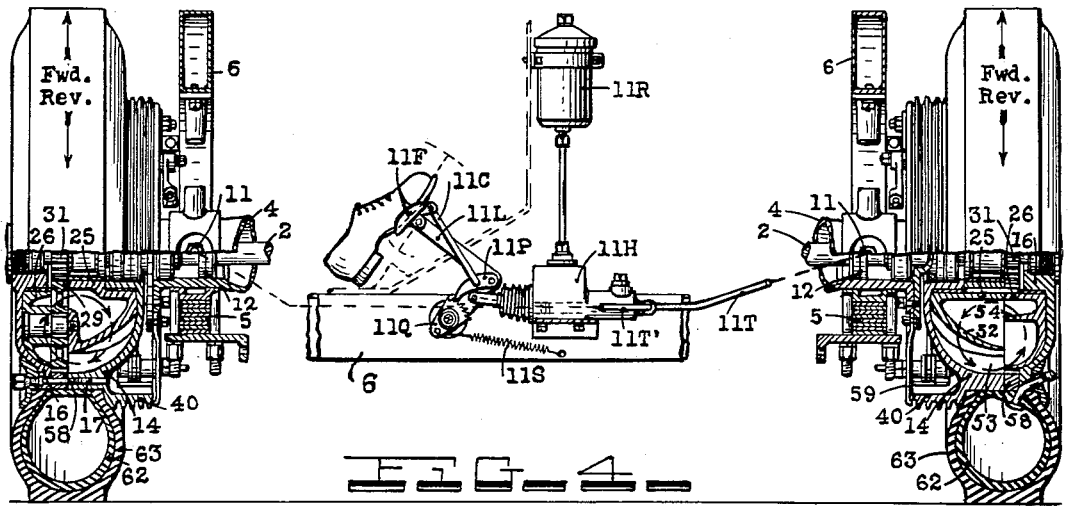
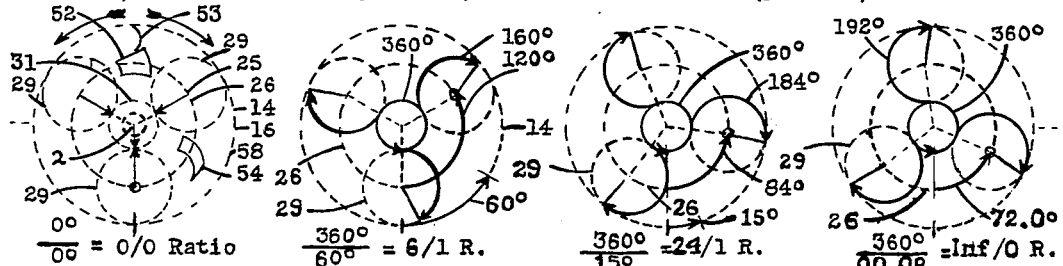
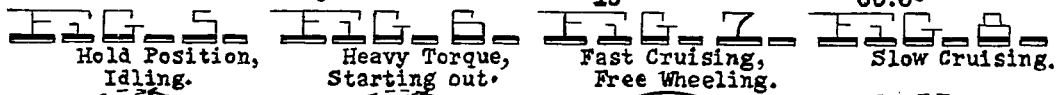
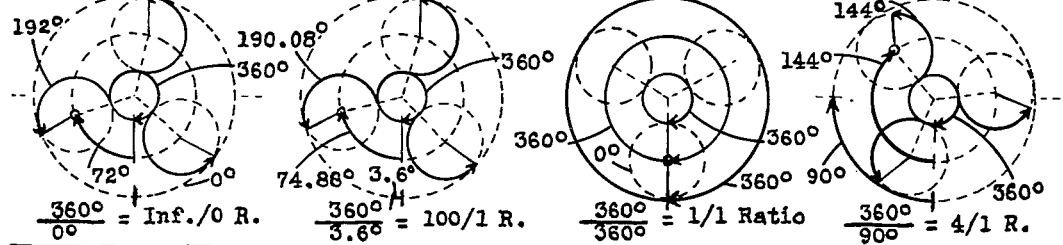
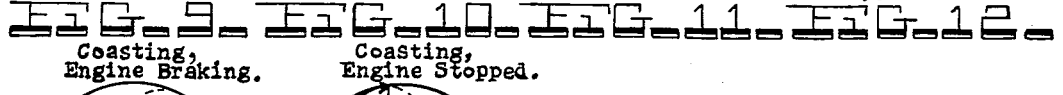
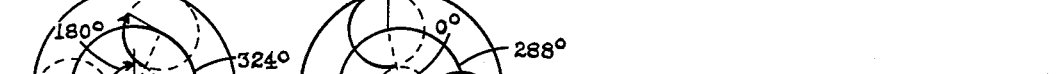
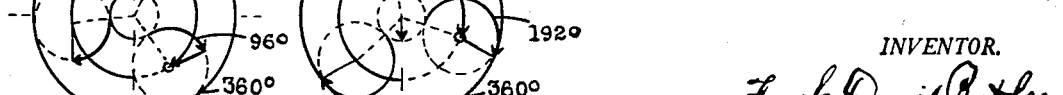
INVENTOR.
Frank David Butler
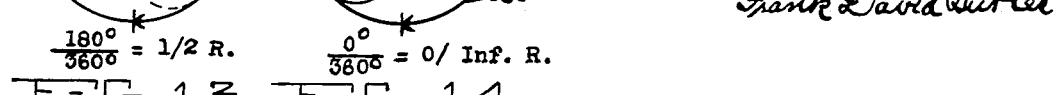

United States Patent Office 2,747,429
Patented May 29, 1956

2,747,429

INTERNAL FLUID PRESSURE VARIABLE, COMBINED HYDRODYNAMIC AND PLANETARY GEARING DRIVEN, REVERSIBLE SUN-GEAR TYPE OF TRANSMISSION COUPLER

Frank David Butler, Venice, Calif.

Application September 18, 1951, Serial No. 247,095

9 Claims. (Cl. 74—688)

While my invention relates in general to all closed types of hydrodynamical transmission couplers, it relates more particularly to those of a combined hydrodynamical and planetary gearing driving type.

One object of my invention improvement is to provide a variable fluid pressure means, applicable to within the coupler, by which to bolster the clutching of a portion rotatable with the hydrodynamical driving member against a portion rotatable with the hydrodynamically driven member of this coupler, in parallel with a progressive hydrodynamically actuated locking and clutching means generated between such two members. By the provision and application of this fluid pressure bolstering means, accelerating such locking and clutching means, the latter is made variable at will in either direction of sun-gear rotation.

Another object of my invention improvement is to provide a combined hydrodynamical and planetary gearing driven coupler, of this internal fluid pressure actuated bolstered clutching type, as forming the hub proper of an automotive vehicle traction wheel. In such type of combined coupler, a sun-gear secured to and rotatable coaxially with a reversible driving shaft forms the driving member; a coaxially rotatable combined orbit-gear-carrier and multi-bucketed closed fluid receptacle casing forms the gearing and hydrodynamically driven member; and, a coaxially rotatable combined planet-gear-carrier and multi-vaned impeller forms the intermediate and hydrodynamical driving member thereof.

Other improvements include: constructing said intermediate member conical in shape axially so that it will have differential end area clutching surfaces and will be provided, during its rotation in either direction, with an initial axial clutching thrust towards one or the other of its ends, depending upon the circulation of fluid within the coupler; providing said intermediate member with a row of series of symmetrically spaced convex shaped blades or vanes, and an adjacent row of series of concave shaped scoops wherein such vanes and scoops extend helically to the axis of rotation of such intermediate member, in the same direction of rows; and, wherein all of said vanes and scoops are provided for circulating fluid, within said driven member, during either direction of rotation of said planet-gear-carrier intermediate member.

While the gearing ratio, between the driving sun-gear and the driven orbit-gear of the coupler is a matter of choice, the examples illustrated herein are of a 4 to 1 ratio, wherein, with the intermediate member stopped, it would require four clockwise revolutions of the sun-gear to rotate the orbit-gear one complete revolution (in reverse) anti-clockwise. Otherwise, as with the orbit gear stopped, it would require five clockwise revolutions of said sun-gear to rotate said intermediate member one clockwise revolution about said sun-gear, and wherein the change from a 4 to 1 to a 5 to 1 ratio is due to the fact that said intermediate member carries the planet-gears through 360° of arc during each 5 revolutions of said sun-gear. Wherein the rotation of the intermediate member with the sun-gear is equal to one (gearing ratio plus one). While the rotation of such intermediate member with the orbit-gear and its carrier is equal to gearing ratio (gearing ratio plus one). Thus it is apparent that as the orbit-gear and its carrier start to rotate, under normal operating conditions, the gearing ratio of the coupler will be automatically changed thereby, and wherein a one to one ratio may be progressively generated between the rotation of the sun-gear and the rotation of the orbit-gear and its carrier, and vice versa as the torque load is increased and the relative speed of rotation of such orbit-gear and its carrier is decreased.

With reference to the accompanying drawings forming a part hereof—Fig. 1 is a longitudinal section of the left rear wheel coupler assembly, as per my invention, as such assembly would appear on the dotted and broken line 1—1 of Fig. 3; Fig. 2 is a combined plan and broken away section of a portion of Fig. 3 and is as it would appear on the dotted and broken line 2—2 of the latter, this Fig. 2 illustrates a portion of a braking means applicable to a brake-drum rotative with the driven member of the coupler; Fig. 3 is the assembly illustrated in Fig. 1 and is jointly in elevation and in section, the right half of this Fig. 3 is as the coupler parts would appear on the dotted and broken line 3—3 of Fig. 1, the upper left quarter is as the parts would appear on the dotted line 3'—3' of Fig. 1, and the lower left quarter as such parts would appear on the dotted and broken line 3"—3" of Fig. 1; Fig. 4 illustrates the application of two of my couplers, with one applied to each of two opposite rear traction wheels of an automotive vehicle as forming the hubs proper of such traction wheels, and with a means illustrated diagrammatically intermediate to such wheels for supplying fluid under a variable pressure, to the interior of each such coupler; Fig. 5 is a diagrammatic sketch illustrating the left rear wheel coupler assembly with all parts at rest; and, Figs. 6 to 14 inclusive diagrammatically illustrate different conditions of coupler operations as outlined in the title caption of each such figure, and which figures are for convenience in describing the coupler.

With reference to the drawings, similar numerals indicate similar parts in the several views and diagrammatic sketches, the numeral 1 indicates a flanged coupling that is a slidable splined fit with the reversible axle shaft 2 and may be detached from the motive power means, not illustrated, but connected to rotate shaft 2 in either direction; the latter may be journalled, at its coupling end, on a pair of opposed tapered roller bearings 3 located within the tubular axle housing 4, which latter forms the stator member and is supported on and attached to a conventional multiple-leaf-spring 5 which latter supports the car-frame 6 after the usual manner; this housing 4 may be secured, at the motive power means end, to the flanged detachable coupling housing 7, with a series of stud-bolts 8, and at its wheel end, to the relatively large diameter flanged stator member 9 with a series of stud-bolts 10; each housing 4 is provided with an internally threaded boss 11 having free access to within the adjacent coupler and through which fluid under a variable pressure may be supplied internally to such coupler as illustrated in Figs. 1 and 4 and which will be described later; and means, in the form of a pair of tandem, garter spring loaded, wiper-seal-rings 12 are provided for maintaining the coupler fluid pressure tight at one end of housing 4, while a hollow bellows Sylphon type of seal 13 may be provided at the wheel end of such housing for such purpose.

The rotatable closed fluid receptacle casing 14 is halved and is the main body member of the coupler and forms the hub proper of the traction wheel assembly and is rotatively journalled on the opposed tapering roller bearings 15 and 18 adjustably secured on the shaft 2, and wherein the bearing 18 is adjustable by the nut 19 and tongued locking-washer 20 secured respectively with a cotter-key 21 and in the groove 22; and, wherein a threaded hub-cap 23, equipped with a gasket 24, seals off the hub-cap access to the interior of the coupler.

This halved closed casing 14 is annular in shape and is provided with the outer one-half thereof forming a conical disc 16 which may be provided with a rabbet type of joint with the inner one-half of such casing, and the two halves secured together with the series of symmetrically spaced collared stud-bolts 17 located in the casing rim.

The impeller 25 for circulating fluid within the casing 14 is annular in shape and is rotatable coaxially to the casing 14 and to said shaft 2 and is secured to the planetary-gear-carrier 26 by rivets 34 or cap-screws 35, and is thus formed into a combined unit which is the hydrodynamical driving member, planetary-gear carrier, and the intermediate member of the coupler. Such intermediate member is provided with a series of planet-gears 29 which are each journalled on a series of needle-type roller bearings 28 which latter in turn are journalled on shouldered pins 27 which pins are pressed into member 26. Each planet-gear 29 meshes with both the sun-gear 31 and the orbit gear 58 and forms an idling rotative means between such gears. The sun gear 31 is splined fit with the spline 30 of shaft 2 and is constructed integral with an elongated sleeve 31' which forms a journal for a series of needle bearings 32 which latter form journals for the hardened bushing 33 which is pressed into members 25 and 26 and rotatively support same, and said members 25 and 26 may also be provided with conventional type of insert-bearings 36. This intermediate member, consisting of 25 and 26, is constructed conically in shape, is axially slidable within casing 14 and is provided with differential end areas clutching surfaces 25' and 55 located at opposite ends thereof and which match with adjacent differential area clutching surfaces 14' and 56 respectively, formed within the interior ends of the casing 14 so that, during either direction of rotation of such intermediate member, it will be provided with an initial axial clutching thrust towards one or the other of its ends depending upon the direction of circulation of fluid therewithin such member. The impeller member 25 is provided with a series of symmetrically spaced blades or vanes 52 that extend convexly in the forward direction of coupler rotation and are located adjacent to a similar series of scoops 54 that extend in concave form in said direction of rotation, and wherein said vanes and said scoops all extend helically to parallel with the axis of rotation in a predetermined manner, and are all for circulating fluid during the rotation of said intermediate member, and for providing the latter with an initial axial clutching thrust towards its larger diameter end during its normal forward direction of rotation, and an initial axial clutch-thrust towards it smaller diameter end during its reverse rotation within the closed casing 14.

The car side of the halved coupler casing 14 is provided with a series of vanes or buckets 53 symmetrically spaced within a rim portion thereof, radially outward from the series of vanes 52 of the impeller, and wherein such casing, combined with the disc 16, forms the hydrodynamically driven member, as well as the orbit-gear-carrier and closed fluid receptacle casing 14 of the coupler, that may be rotated in either direction by said intermediate member. The outer periphery of this casing 14 forms a flanged tire rim for supporting the inner tube 62 and tire casing 63 of the pneumatic traction wheel, and such tire casing is secured in place by the demountable tire rim which is bolted against the flank of the disc 16 with the conical nuts 37 threaded onto the outer ends of the stud-bolts 17, while the flanged brake-drum 40 is secured against the flank of the casing 14 by the opposite threaded ends of such stud-bolts. The adjacent semi-radial extending face of the disc 16 and larger diameter end face of the intermediate member are provided with clutching surfaces 56 and 55 respectively and one or the other of such faces is provided with a series of relatively sharp edged radially extending wiper grooves 57 for circulating cooling fluid across such clutching surfaces and simultaneously reducing the film thickness of such fluid and thus causing substantially metal to metal contact between such adjacent surfaces. Oppositely located vent and drain plugs 60 are threaded through the disc 16 into the inside of the casing 14, and the outer ends of the stud-bolts 17 are grooved for snap-rings 38 which hold the dust cover plate 39 in place over the nuts 37.

Inasmuch as the traction wheel coupler combination may be used for purposes other than in connection with an automotive vehicle, the coupler brake-drum 40 may be braked by a combined hydraulically and mechanically operated braking means consisting briefly of a pair of halved type of brake-shoes 41 anchored at one end thereof with the conventional type of cam-bolts to the halved dust cover 59, and provided adjacent the hydraulic brake cylinder 41', near the opposite ends thereof, with hardened bosses 42 within which latter, the mechanically operated cams 43 are provided both for adjusting the brake-shoes 41 within close proximity to the inner surface of the brake-drum, and to be operated as an emergency braking means through the pull-rod 46 connected via the serrated levers 45 to the serrated ends 44 of the cams 43, and provided with the limit stop screws 51 and the retraction springs 50, and also wherein the hardened bosses 42 are provided with dust covers 48 and horse-shoe type of retainer snap-rings 49 which latter lock in grooves in opposite to the serrated ends of cams 43, and wherein each cam is provided with a lubricating fitting 47.

While practically any remote means could be used for applying fluid under a variable bolstering pressure to the interior of the multi-vaned closed fluid casing 14 via the access 11 in each of the tubular axle housings 4, an example of one method is diagrammatically illustrated in the intermediate portion of Fig. 4, and wherein fluid under a static head is supplied from a vented reservoir 11R to a common, variable hydraulic master cylinder means 11H provided with at least two tubing connections 11T and 11T', with one of the latter leading to each adjacent coupler and traction wheel assembly access fitting 11 as illustrated in said Fig. 4; this master hydraulic cylinder 11H is provided with the usual reciprocating plunger operatable by the pivoted crank-lever 11L which latter is provided with a pivoted foot-treadle 11F and a pivoted latching pawl 11P joined together with a connecting link 11C, and wherein a variable oscillation of such lever 11L will apply a variable fluid pressure to the interior of said casing 14; a coil-spring 11S is provided for retracting the lever 11L and a stator latching quadrant 11Q is provided whereby pressure may be temporarily held on the couplers; and, wherein the tubing connections 11T and 11T' are vented to the atmosphere each time the fluid pressure is released via a vent in the top of the reservoir 11R.

While the sun-gear 31 is reversible in this present coupler so that the coupler and traction wheel may be varied in rotation in either direction, by the application of said variable fluid pressure to the interior of said coupler driven member 14 as an actuating means for bolstering clutching and fluid locking between said intermediate and driven members of the coupler, I am aware of the fact that, if such intermediate member were to be stopped in its rotation by any positive means, the result would be the reversing of the driven member through the common planetary gearing action and that the coupler would then be reversible within itself.

In this type of coupler the major object is to variably bolster the variable clutching of a means rotatable with the intermediate member of the coupler against an adjacent clutching surface means rotatable with the driven member of the coupler in parallel with a progressive hydrodynamically actuated fluid locking and clutching means generated between such two members. In such type of bolstered clutching means, the surfaces that are to be clutched together should be initially in contact with one another at the time the actuating means of such clutching is applied. Thus in this coupler, and due jointly to the differential area clutching surfaces of the intermediate and driven members of the coupler as combined with the similar helix angles of the row of fluid impelling vanes 52 and row of fluid induction scoops 54 of said intermediate member, the latter is initially axially displaced within said driven member towards the larger area clutching surfaces, during forward rotation fluid circulation, while such intermediate member is initially axially displaced in the opposite direction within said driven member during reverse rotation fluid circulation, and wherein during the latter circulation, the row of fluid impelling vanes 52 become fluid induction scoops, while the row of fluid induction scoops 54 become fluid impelling vanes and whereby the axial direction of fluid flow and helix angle thrust are both reversed.

While the major part of this invention specification has been focused upon my invention as applicable to the combined hydrodynamical and planetary gearing driven coupler, it should be definitely understood that it is equally applicable to the conventional hydrodynamically driven coupler, inasmuch as I provide a means of variable fluid pressure bolstering clutching between a portion rotatable with the hydrodynamical driving member and a portion rotatable with the hydrodynamical driven member of the coupler in parallel with the progressive hydrodynamically actuated fluid locking and clutching means generated between these two members of the coupler.

With reference to Figs. 1 and 4, it can be seen that the tire casing 63 and inner tube 62 may be conveniently removed for repairs, without molesting the coupler proper, by removal of the nuts 37 and the demountable rim. Also with reference to Figs. 1, 3 and 4, it can be seen how, by removal of the series of cap-screws 61 and the halved stator dust covers 59, the halves of the braking means, including the halved shoes 41, can be conveniently removed without molesting the coupler proper. While, with reference to Fig. 4, it can be seen how the orbit-gear 58 may be secured between the halves of the coupler casing 14, and with further examination of this Fig. it may be seen how the coupler wheel assembly combination has been applied in such a manner that such traction wheels do not appear conspicuous because of the couplers forming the hubs proper of such oppositely located traction wheels.

This reversible sun-gear type of combined hydrodynamical and planetary gearing driven coupler is especially adaptable with a one direction rotatable motive power means coupled to the sun-gear of a variable reversible planetary gearing reduction means via a bevel pinion gear rotating a bevel ring-gear and wherein no differential is required.

While cars equipped with this type of coupler need only to carry an inner tube and tire casing for replacement of the pneumatic units, garages should carry a complete right and a complete left coupler wheel assembly including the stub shaft 2 thereof, and which may be applied by removal of the nuts of the stud-bolts 10 extending through flanges 9 and 4'.

With reference to Figs. 5 to 14 inclusive, these diagrammatical sketches are substantially self explanatory and illustrate the various rotative movements of the driving, driven and intermediate members of the coupler under various different conditions of operations, and also under different directions of rotation of the driving sun-gear.

Thus having fully described my invention, I claim:

1. In a closed type of combined hydrodynamical and planetary gearing driven transmission coupler equipped with a reversible shaft mounted elongated sun-gear forming the gearing driving member of the coupler; a coaxially rotatable, conically shaped, axially displaceable, combined dual row vaned fluid impeller and planet-gear-carrier forming the hydrodynamical driving and intermediate member of the coupler; an annual shaped, coaxially rotatable, multiple-curved-bucketed, combined closed fluid receptacle casing and orbit-gear-carrier forming the gearing and hydrodynamically driven member of the coupler wherein said driving member sun-gear is engaged with planet gears of the intermediate driving member and the orbit-gear of said driven member is engaged with said planet gears; and, an externally remotely located manually operable variable fluid pressure means applicable at will to within said closed casing, improvements in such a coupler assembly by the following provision therein of; means, providing said intermediate member with a plurality of radially extending differential area clutching surfaces with one located at each end thereof; means, providing said driven member with a plurality of radially extending matching differential area clutching surfaces with one located at each internal end thereof; means, providing said dual row of vanes and multiple-curved-buckets respectively of said intermediate and driven members as the fluid circulating elements within said closed casing and to consist of, one row of helically extending convex shaped fluid impelling vanes provided to simultaneously force fluid axially within said intermediate member towards the smaller area end of the latter and radially outward into said buckets of said driven member, during normal operation, and to thereby provide said intermediate member with an initial axial clutching thrust against the larger area clutching surface of said driven member, and one row of helically extending concave shaped vaned fluid induction scoops provided to simultaneously induce fluid inward radially from said buckets and to force it axially towards the smaller area end of said intermediate member in between said row of fluid impelling vanes thereof, during such normal operation, and to thereby provide said intermediate member with an additional axial clutching thrust against said larger area clutching surface of said driven member; means, applicable during the reverse rotation of said reversible shaft and said intermediate and driven members, whereby said impelling vanes become induction scoops and the first mentioned induction scoops become fluid impelling vanes and wherein the axial clutching thrust of said intermediate member is then in the opposite direction and against the smaller area clutching surface of said driven member due to the reversal of the fluid flow within the coupler; means, applicable during the acceleration of said intermediate member in either direction of shaft rotation, whereby said intermediate and driven members are simultaneously progressively hydrodynamically locked and clutched together and then rotate in synchronism as a single unit; and, means, applicable during the supply of fluid from said variable fluid pressure means to within said closed casing, whereby the hydrodynamically actuated progressive locking and clutching of said intermediate member respectively with and against said driven member may be variably bolstered during either direction of rotation of the rotative elements of the coupler.

2. In a closed type of combined hydrodynamical and planetary gearing driven transmission coupler equipped with a reversible shaft mounted elongated sun-gear forming the gearing driving member of the coupler; a coaxially rotatable, conically shaped, axially displaceable, combined dual row vaned fluid impeller and planet-gear-carrier forming the hydrodynamical driving and intermediate member of the coupler; an annular shaped, coaxially rotatable, multiple-curved-bucketed, combined closed fluid receptacle casing and orbit-gear-carrier forming the gearing and hydrodynamically driven member of the coupler wherein said driving member sun-gear is engaged with planet gears of the intermediate driving member and the orbit-gear of said driven member is engaged with said planet gears; and, an externally remotely located manually operable variable fluid pressure means applicable at will to within said closed casing, combination improvements in such a coupler assembly comprising: means, providing said intermediate member with a plurality of radially extending differential area clutching surfaces with one located at each end thereof; means, providing said driven member with a plurality of radially extending differential area clutching surfaces with one located at each internal end thereof; means, providing said dual row of vanes and multiple-curved-buckets respectively of said intermediate and driven members as the fluid circulating elements within said closed casing and to consist of, one row of helically extending convexed shaped fluid impelling vanes provided to simultaneously force fluid axially within said intermediate member towards the smaller area end thereof and radially outward into said buckets of said driven member, during normal operation, and to thereby provide said intermediate member with an initial axial clutching thrust against the larger area clutching surface of said driven member, and one row of helically extending concave shaped vaned fluid induction scoops provided to simultaneously induce fluid inward radially from said buckets and to force it axially towards the smaller area end of said intermediate member in between said row of fluid impelling vanes thereof, during such normal operation, and to thereby provide said intermediate member with an additional axial clutching thrust against said larger area clutching surface of said driven member; means, applicable during the reverse rotation of said reversible shaft and said intermediate and driven members, whereby said impelling vanes become induction scoops and the first mentioned induction scoops become fluid impelling vanes and wherein the axial clutching thrust of said intermediate member is then in the opposite direction and against the smaller area clutching surface of said driven member due to the reversal of the fluid flow within the coupler; means, applicable during the acceleration of said intermediate member, in either direction of shaft rotation, whereby such intermediate and driven members are simultaneously progressively hydrodynamically locked and clutched together and then rotate in synchronism as a single unit; and, means, applicable during the supply of fluid from said variable fluid pressure means to within said closed casing, whereby the hydrodynamically actuated progressive locking and clutching of said intermediate member respectively with and against said driven member may be variably bolstered during either direction of rotation of the driving and driven members.

3. The coupler of claim 1 characterized in that due to the fact that the helix angle of the row of fluid impelling vanes and the helix angle of the row of fluid induction scoops are substantially the same, the thrust pressure developed by the displacement of the fluid handled by both rows tends to axially displace and to thereby clutch said hydrodynamical driving member against said larger area clutching surface of said driven member during the normal forward rotation of said driving member, while the thrust pressure developed by the displacement of the fluid handled by both of said rows, during the reverse rotation of said driving member, tends to axially displace and to thereby clutch said driving member in the opposite direction and against said smaller area clutching surface of said driven member, and, wherein both such forward and reverse clutchings are in parallel with the progressive hydrodynamically locking of said hydrodynamical driving and hydrodynamically driven members of such coupler tending to accomplish a similar purpose of synchronizing the rotation of such driving and driven members.

4. The coupler of claim 1 characterized and exemplified in that, during the normal forward rotation of said hydrodynamical driving member, said row of fluid impelling vanes as combined with said row of fluid induction scoops tend to produce a circular flow circulation of the fluid in one direction within the coupler in the form of an annular ring extending around the axis of rotation of said driving member, while, during the reverse rotation of said hydrodynamical driving member, such fluid flow circulation will be reversed in the direction of its flow but will continue in said annular ring form extending around said axis of rotation of said driving member, and thus such circular annular ring shaped flow results in a relatively efficient method of fluid circulation within said coupler during either direction of rotation of said driving and driven members thereof.

5. The coupler of claim 1 characterized in that it may be used as forming the hub proper of a traction wheel in one of its many uses, and in such an event and form, the gearing ratio existing between the rotation of said reversible shaft mounted sun-gear and the relative rotation of said orbit-gear-carrier driven member could extend over a range of ratios extending between infinity rotation of said sun-gear to zero rotation of said driven member, and from one revolution of said sun-gear to one revolution of said orbit-gear-carrier driven member in either direction of rotation of said sun-gear, and wherein such a relatively desirable gearing ratio range is due to the fact that said row of fluid impelling vanes and said row of fluid induction scoops are carried by said combined fluid impeller and planet-gear-carrier forming the hydrodynamical driving and intermediate member of the coupler and which receives rotative drive both from said sun-gear and said orbit-gear-carrier during the rotative operation of the coupler in either direction of its rotation, also wherein the desired gearing ratio changes are substantially accomplished automatically in relative proportion to the torque load being applied to said orbit-gear-carrier and the acceleration being applied to said sun-gear during either direction of rotation of said coupler, and wherein such one to one ratio between said sun-gear and said orbit-gear-carrier will result in relatively saving fuel in the motive power means due to such direct ratio being made available under normal coupler operation.

6. In a closed type of annular shaped hydrodynamical transmission coupler equipped with an elongated reversible shaft rotatable concentrically within said coupler and forming the rotative driving means; a halved type of coaxially rotatable, axially displaceable, dual row vaned fluid impeller forming the hydrodynamical driving member; a halved type of annular shaped coaxially rotatable, multiple-bucketed, closed fluid receptacle casing forming the hydrodynamically driven member wherein said driving means may be drivingly connected to the driven member via planetary gearing forming a part of said driving member and meshing with an orbit-gear forming a part of said driven member; and, an externally remotely located manually operable variable fluid pressure means applicable at will to within said closed casing, improvements in such a coupler assembly comprising: means, providing said driving member of annular conical shape and with a plurality of radially extending differential area clutching surfaces with one located at each end thereof; means, providing said driven member with a plurality of similar radially extending differential area clutching surfaces with one located at each internal end thereof and matching with the first mentioned differential area clutching surfaces; means, providing said dual row of vanes and multiple-buckets respectively of said driving and driven members as the fluid circulating elements within said closed casing and to consist of, one row of helically extending convex shaped fluid impelling vanes provided to simultaneously force fluid axially within said driving member towards the smaller area end thereof and radially outward into said buckets of said driven member, during normal operation, and to thereby provide said driving member with an initial axial clutching thrust against the larger area clutching surface of said driven member, and one row of helically extending concave shaped vaned fluid induction scoops provided to simultaneously induce fluid inward radially from said buckets and to force it axially towards the smaller area end of said driving member in between said row of fluid impelling vanes thereof, during such normal operation, and to thereby provide said driving member with an additional axial clutching thrust against said larger area clutching surface of said driven member; means, applicable during the reverse rotation of said reversible shaft and said driving and driven members, whereby said impelling vanes become induction scoops and the first mentioned induction scoops become fluid impelling vanes and wherein the axial clutching thrust of said driving member is then reversed and is against the smaller area clutching surface of said driven member due to the reversal of the fluid flow within said closed casing; means, applicable during the acceleration of said driving member in either direction of shaft rotation, whereby said driving and driven members are simultaneously progressively hydrodynamically locked and clutched together and then rotate in synchronism as a single unit; and, means, applicable during the supply of fluid from said variable fluid pressure means to within said closed casing, whereby the hydrodynamically actuated progressive locking and clutching of said driving member respectively with and against said driven member may be variably bolstered during either direction of rotation of the rotative elements of the coupler.

7. In a closed type of annular shaped hydrodynamical transmission coupler equipped with an elongated reversible shaft rotatable concentrically within said coupler and forming the rotative driving means; a halved type of coaxially rotatable, axially displaceable, dual row vaned fluid impeller forming the hydrodynamical driving member; a halved type of annular shaped coaxially rotatable, multiple-bucketed, closed fluid receptacle casing forming the hydrodynamically driven member wherein said driving means may be drivingly connected to the driven member via planetary gearing forming a part of said driving member and meshing with an orbit-gear forming a part of said driven member; and, an externally remotely located manually operable variable fluid pressure means applicable at will to within said closed casing, combination improvements in such a coupler assembly comprising: means, providing said driving member of annular conical shape and with a plurality of radially extending differential area clutching surfaces with one located at each end thereof; means, providing said driven member with a plurality of matching radially extending differential area clutching surfaces with one located at each internal end thereof; means, providing said dual row of vanes and multiple-buckets respectively of said driving and driven members as the fluid circulating elements within said closed casing and to consist of, one row of helically extending convex shaped fluid impelling vanes provided to simultaneously force fluid axially within said driving member towards the smaller area end thereof and radially outward into said buckets, under normal operation, and to thereby provide said driving member with an initial axial clutching thrust against the larger area clutching surface of said driven member, and one row of helically extending concave shaped fluid induction vaned scoops provided to simultaneously induce fluid inward radially from said buckets and to force it axially in between said row of fluid impelling vanes towards the smaller area end of said driving member, during such normal operation, and to thereby provide said driving member with an additional axial clutching thrust against said larger area clutching surface of said driven member; means, applicable during the reverse rotation of said reversible shaft and said driving and driven members, whereby said fluid impelling vanes become fluid induction scoops and the first mentioned induction scoops become fluid impelling vanes and whereby the axial clutching thrust of said driving member is then reversed and is applied in the opposite direction and against the smaller area clutching surface of said driven member due to the reversal of the fluid flow within said closed casing; means, applicable during the acceleration of said driving member, in either direction of shaft rotation, whereby said driving and driven members are simultaneously progressively hydrodynamically locked and clutched together and then rotate in synchronism as a single unit; and means, applicable during the application of said fluid pressure means to within said closed casing, whereby the hydrodynamically actuated progressive locking and clutching of said driving member respectively with and against said driven member may be variably bolstered during either direction of rotation of the rotative elements of the coupler.

8. A closed type of annular shaped combined hydrodynamical and planetary gearing driven transmission coupler, comprising as a whole assembly of: a concentrically rotatable, reversible shaft mounted, elongated sun-gear forming the gearing driving member of the coupler; a coaxially rotatable, conically shaped, axially displaceable, combined dual row vaned fluid impeller and planet-gear-carrier forming the hydrodynamical driving and intermediate member of the coupler and provided with a plurality of radially extending differential area clutching surfaces with one located at each end thereof; an annular shaped, halved type of coaxially rotatable, multiple-bucketed, combined closed fluid receptacle casing and orbit-gear-carrier forming the gearing and hydrodynamically driven member of the coupler and provided with a plurality of radially extending matching differential area clutching surfaces with one located at each internal end thereof wherein said driving member sun-gear is engaged with planet gears of the intermediate driving member and the orbit-gear of said driven member is engaged with said planet gears; means, providing said dual rows of vanes and multiple-buckets respectively of said driving and driven members as the fluid circulating elements within said closed casing and to consist of, one row of helically extending convex shaped fluid impelling vanes provided to simultaneously force fluid axially within said driving member towards the smaller area end thereof and radially outward into said buckets, under normal operation, and to thereby provide said driving member with an initial-axial clutching thrust against the larger area clutching surface of said driven member, and one row of helically extending concave shaped vaned fluid induction scoops provided to simultaneously induce fluid inward radially from said buckets and to force it axially between said row of fluid impelling vanes towards the smaller area end of said driving member, during such normal operation, and to thereby provide said driving member with an additional axial clutching thrust against said larger area clutching surface of said driven member; means applicable during the reverse rotation of said reversible shaft and said driving and driven members, whereby said fluid impelling vanes become fluid induction scoops and the first mentioned induction scoops become fluid impelling vanes and whereby the axial clutching thrust of said driving member is then reversed and is applied in the opposite direction against the smaller area clutching surface of said driven member due to the reversal of the fluid flow within said closed casing; means, applicable during the progressive acceleration of said driving member, in either direction of shaft rotation, whereby said driving and driven members are simultaneously progressively hydrodynamically locked and clutched together and progressively start to rotate in synchronism as a single unit; and, an externally remotely located manually operable variable fluid pressure means applicable at will to within said closed casing whereby the hydrodynamically actuated progressive locking and clutching of said driving and driven members together as a single unit may be variably bolstered during either direction of rotation of the rotative elements of the coupler, and whereby such clutching can be thereby applied in advance of the normal progressive locking of said hydrodynamical driving and hydrodynamically driven members of said coupler together as a single rotative unit.

9. A closed type of annular shaped combined hydrodynamical and planetary gearing driven transmission coupler, comprising in combination as a whole: a concentrically rotatable, reversible shaft mounted, elongated sun-gear forming the gearing driving member of the coupler; a halved type of coaxially rotatable, conically shaped, axially displaceable, combined dual row vaned fluid impeller and planet-gear-carrier forming the hydrodynamical driving and intermediate member of the coupler and provided with a plurality of radially extending differential area clutching surfaces with one located at each end thereof; an annular shaped, halved type of coaxially rotatable, multiple-bucketed, combined closed fluid receptacle casing and orbit-gear-carrier forming the gearing and hydrodynamically driven member of the coupler and provided with a plurality of radially extending matching differential area clutching surfaces with one located at each internal end thereof wherein said driving member sun-gear is engaged with planet gears of the intermediate driving member and the orbit-gear of said driven member is engaged with said planet gears; means providing said dual row of vanes and multiple-buckets respectively of said driving and driven members as the fluid circulating elements within said closed casing and to consist of, one row of helically extending convexed shaped fluid impelling vanes provided to simultaneously force fluid axially within said driving member towards the smaller area end thereof and radially outward into said buckets, under normal operation, and to thereby provide said driving member with an initial axial clutch-thrust against the larger area clutching surface of said driven member, and one row of helically extending concave shaped vaned fluid induction scoops provided to simultaneously induce fluid inward radially from said buckets and to force it axially between said row of fluid impelling vanes towards the smaller area end of said driving member, during such normal operation, and to thereby provide said driving member with an additional axial clutching thrust against said larger area clutching surface of said driven member; means, applicable during the reverse rotation of said reversible shaft and said driving and driven members, whereby said fluid impelling vanes become fluid induction scoops and the first mentioned fluid induction scoops become fluid impelling vanes and whereby the axial clutching thrust of said driving member is then reversed and is applied in the opposite direction and against the smaller area clutching surface of said driven member due to the reversal of the fluid flow within said closed casing; means, applicable during the progressive acceleration of said driving member, during either direction of shaft rotation, whereby said driving and driven members are simultaneously progressively hydrodynamically locked and clutched together and progressively start to rotate in synchronism as a single unit; and, an externally remotely located manually operable variable fluid pressure means applicable at will to within said closed casing, whereby the hydrodynamically actuated progressive locking and clutching of said driving and driven members together as a single unit may be variably bolstered during either direction of rotation of the rotative elements of the coupler, and whereby such clutching may be thereby applied in advance of the normal progressive locking and clutching of said hydrodynamical driving and hydrodynamically driven members of said coupler together as a single rotative unit.

References Cited in the file of this patent
UNITED STATES PATENTS

| | | |
|---|---|---|
| 1,977,033 | Adams | Oct. 16, 1934 |
| 2,131,619 | Duffield | Sept. 27, 1938 |
| 2,143,115 | Stewart | Jan. 10, 1939 |
| 2,287,498 | Scofield | June 23, 1942 |
| 2,335,544 | Schnetzer | Nov. 30, 1943 |
| 2,438,040 | Duhamie | Mar. 16, 1948 |
| 2,462,974 | King | Mar. 1, 1949 |
| 2,529,787 | Shepebrich | Nov. 14, 1950 |
| 2,544,542 | Palen et al. | Mar. 6, 1951 |
| 2,572,310 | Brown | Oct. 23, 1951 |
| 2,595,628 | Baule | May 6, 1952 |
| 2,598,876 | Ash | June 3, 1952 |
| 2,687,048 | Butler | Aug. 24, 1954 |